USO05612910A

United States Patent [19]
Meyer

[11] Patent Number: 5,612,910
[45] Date of Patent: Mar. 18, 1997

[54] CIRCUIT FOR INVERTING ELEMENTS OF A FINITE FIELD

[75] Inventor: Jacques Meyer, La Tronche, France

[73] Assignee: SGS-Thomson Microelectronics S.A., Saint Genis Pouilly, France

[21] Appl. No.: 501,964

[22] Filed: Jul. 13, 1995

[30] Foreign Application Priority Data

Aug. 5, 1994 [FR] France ................... 94 09927

[51] Int. Cl.$^6$ .............................. G06F 7/00; G06F 15/00
[52] U.S. Cl. ........................................................ 364/746.1
[58] Field of Search ......................... 364/746.1, 716, 364/724.16, 724.19, 748, 754, 757, 753, 758, 759, 752, 760, 786, 787; 341/87; 327/199, 408; 326/38; 371/375

[56] References Cited

U.S. PATENT DOCUMENTS

| | | | |
|---|---|---|---|
| 4,866,654 | 9/1989 | Yamada | 364/754 |
| 4,975,867 | 12/1990 | Weng | 364/746.1 |
| 4,989,171 | 1/1991 | Hollmann | 364/746.1 |
| 4,994,995 | 2/1991 | Anderson et al. | 364/746.1 |
| 5,068,856 | 11/1991 | Nagasawa et al. | 371/37.5 |
| 5,465,069 | 11/1995 | Boiron et al. | 327/333 |
| 5,467,297 | 11/1995 | Zook | 364/746.1 |

*Primary Examiner*—Roy N. Envall, Jr.
*Assistant Examiner*—Monica Lewis
*Attorney, Agent, or Firm*—David M. Driscoll; James H. Morris; Brett N. Dorny

[57] ABSTRACT

A circuit for inverting a number of n bits of a finite field of $2^n=N+1$ elements comprises a first circuit for raising to the power $t=2^{n/2}$ receiving the number to invert. A first complete multiplier receives the number to invert and the output of the circuit for raising to the power t. A second circuit provides the product of the output of the circuit for raising to the power t and the inverse of the output of the first complete multiplier.

18 Claims, 2 Drawing Sheets

CIRCUIT FOR INVERTING ELEMENTS OF A FINITE FIELD

BACKGROUND OF THE INVENTION

1. Field of the Invention

The present invention relates to circuits and methods carrying out calculations on elements of a finite filed, and particularly to circuits and methods for calculating the inverse of these elements.

2. Discussion of the Related Art

A finite field is a finite set of binary numbers used, for example, to correct errors during transmission of data which are Reed-Solomon encoded.

All the binary numbers of n bits constitute a finite field of $2^n=N+1$ elements, in which an internal addition and multiplication are defined, such that the sum or the product of two numbers of the field is also a number of the field. The addition of two numbers is defined by a bit-to-bit Exclusive-OR between these two numbers. As a consequence, if x is an arbitrary element of the field, $$x+x=2x=0.$$

The multiplication is a conventional multiplication of two binary numbers of n bits as long as it does not generate a carry, i.e., as long as the result does not have bits at 1 of a weight higher than n−1. As soon as a carry is generated, it is combined through Exclusive-OR operations with predetermined bits of the bits of weights from 0 to n−1, that are defined by a so-called generator polynomial of the finite field.

Any non-zero element of the finite field is a power of another non-zero and non-unity element of this finite field. In a finite field of N+1 elements, the powers are defined modulus, N, i.e., $x^i=x^{i+N}$, where x is a non-zero and non-unity element of the finite field and i is a positive or negative integer. The elements of a finite field are written $0, \alpha^0, \alpha^1, \ldots, \alpha^{N-1}$. The elements $\alpha^0$ to $\alpha^{n-1}$ are the numbers $2^0, 2^1, \ldots, 2^{n-1}$ constituting the base of the binary numbers of n bits.

To calculate correction coefficients in a Reed-Solomon decoder, it is necessary to calculate ratios y/x, where y and x are numbers calculated by the decoder and that may have arbitrary values. For this purpose, y is generally multiplied by the inverse of x.

To calculate an inverse, an inverse table stored in a ROM can be used. However, the use of a ROM is not adapted to an integration among other processing circuits with the existing techniques for designing integrated circuits. With these existing techniques, the ROM must be located outside an area where the other elements of the processing circuit are integrated. This causes a substantial large surface to be lost although a ROM needs a relatively small surface.

Another approach is to generate inverses in a wired manner, using logic gates. However, the number of connections between the logic gates in order to carry out the inversion function is so important that the corresponding metallizations occupy a surface equivalent to the lost surface caused by the use of a ROM, although the wired inverter can be integrated among the processing circuits.

SUMMARY OF THE INVENTION

An object of the present invention is to provide a circuit for inverting the elements of a finite field occupying a particularly small surface.

To achieve this object, the present invention decomposes an inversion in several particular operations that can be carried out by circuits occupying a small surface.

A decomposition according to the invention provides a circuit for inverting a number of n bits of a finite field of $2^n=N+1$ elements, comprising a raising circuit for receiving the number and raising the number to the power $t=2^{n/2}$. A first complete multiplier receives the number to invert and the output of the raising circuit for raising the number to the power t. A calculating circuit provides the product of the output of the raising circuit for raising the number to the power t and of the inverse of the output of the first complete multiplier.

According to an embodiment of the invention, the calculating circuit providing the product comprises an inversion circuit to provide the inverse of the output of the first complete multiplier among t−1 possible values, and a second complete multiplier which receives the output of the inversion circuit and the output of the raising circuit for raising the number to the power t.

According to an alternative embodiment of the invention, the calculating circuit which provides the product comprises n/2 multipliers, each multiplier multiplying an input by a constant, the i-th multiplier (i=1, 2, ..., n/2) having a multiplication constant $\beta^{2i}$, where $\beta$ is a (t−1)th root of the unit; n/2 multiplexers, the i-th multiplexer receiving the output of the i-th multiplier at a first input and the output of the (i−1)th multiplexer at a second input, and providing its output to the (i+1)th multiplier, the second inputs of both the first multiplier and the first multiplexer receiving the output of the raising circuit for raising the number to the power t; and a decoder receiving the output of the first complete multiplier and acting on the multiplexers to set in series the multipliers having the constants whose product is the inverse of the output of the first complete multiplier.

According to an embodiment of the invention, the raising circuit for raising to the power t comprises n groups of gates, the i-th group (i=0, 1, ..., n−1) providing the i-th non-zero element of the finite field or a value 0 depending upon the state 1 or 0, respectively, of the i-th bit of the number to be raised to the power t; and n−1 adders, the j-th adder (j=1, 2, ..., n−1) receiving the output of the j-th group of gates and the output of the (j−1)th adder, the first adder receiving the outputs of the first two groups of gates.

According to an embodiment of the invention, the calculating circuit which provides the product comprises t/2−1 multipliers for multiplying the number raised to the power t by a constant, whose constants are (t−1)th roots of the unit distinct one from the other and from the unit, each receiving the output of the raising circuit for raising the number to the power t; a multiplexer controlled by a decoder for selecting the output of one of the t/2−1 multipliers as a function of the output of the first complete multiplier; and an adder receiving the output of the multiplexer and, depending upon the output of the first complete multiplier, value 0 or the number to invert.

The foregoing and other objects, features, aspects and advantages of the invention will become apparent from the following detailed description of the present invention when taken in conjunction with the accompanying drawings.

DETAILED DESCRIPTION

According to the present invention, the inverse $x^{-1}$ of a number x of n bits is expressed by:

$$x^{-1} = x^t / x^{t+1}, \quad (1)$$

where $t = 2^{n/2}$.

Number $x^t$ is particularly easy to calculate, as it will be seen hereinafter, because it is a number raised to the power of a power of two ($t = 2^{n/2}$).

Number $x^{t+1}$ is a (t−1)th root of the unit because $$(x^{t+1})^{t-1} = x^{t^2 - 1} = x^{2^n - 1} = x^N = 1.$$

Accordingly, whatever may be the value of x, $x^{t+1}$ takes only one of the t−1 values $$\alpha^{t+1}, \alpha^{2(t+1)}, \ldots, \alpha^{(t-1)(t+1)}.$$

These t−1 values are written hereafter $\beta, \beta^2, \ldots, \beta^{t-1}$.

Thus, the inverse of number $x^{t+1}$ which has only $t-1 = 2^{n/2} - 1$ possible values $\beta, \beta^2, \ldots, \beta^{t-1}$ is calculated instead of the $2^n - 1$ possible values of the inverse of an arbitrary number. For example, if n=8, number $x^{t+1}$ has 15 possible values instead of 255. Thus, an inversion circuit of number $x^{t+1}$ occupies a significantly smaller surface than an inversion circuit of an arbitrary number, whether it is calculated with a table in ROM or with logic circuits. In addition, this inversion circuit can be provided with only some of the bits of number $x^{t+1}$ which allow to differentiate the t−1 possible values of number $x^{t+1}$.

Figure 1:
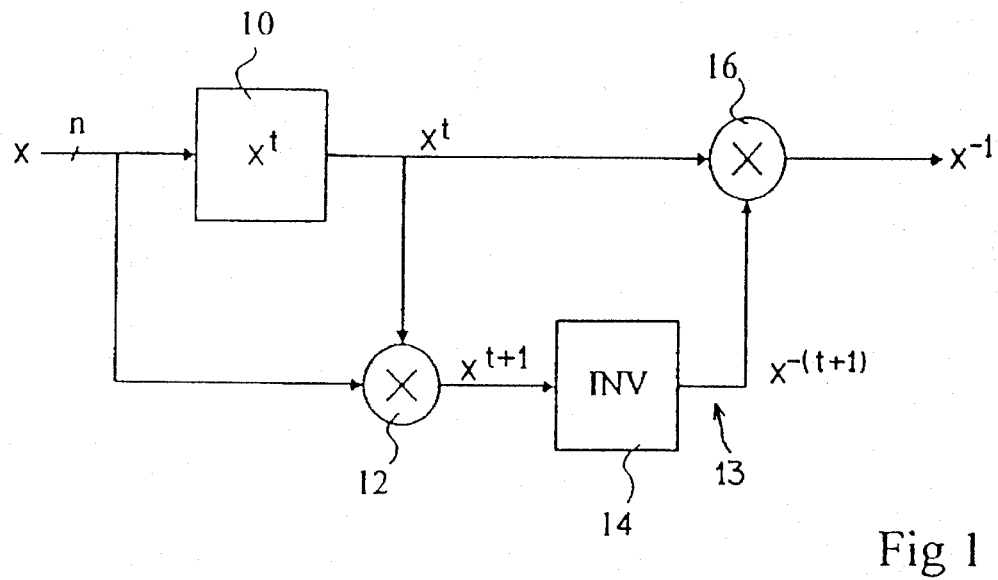
FIG. 1 represents an embodiment of an inversion circuit according to the present invention.

FIG. 1 represents an embodiment of the inversion circuit directly obtained from the above decomposition (1). Number x, of n bits, is provided to a circuit 10 for raising to the power t. A multiplier 12 receives the output of circuit 10 on a first input and number x on a second input. A calculating circuit 13 receives the output of circuit 10 and the output, $X^{t+1}$ of the multiplier 12, and outputs the inverse $X^{-1}$. An inversion circuit 14 of the calculating circuit 13 receives the output, $x^{t+1}$, of the multiplier 12 and provides the corresponding inverse, $x^{-(t+1)}$, to a first input of a multiplier 16. As above indicated, inversion circuit 14 only needs to provide t−1 values. The multiplier 16 of the calculating circuit 13 receives on a second input the output of circuit 10 and provides the desired inverse, $x^{-1}$.

The circuit 10 for raising to the power t, t being a power of 2, is particularly simple to realize for the reasons mentioned below.

Number x is expressed by $$x = x_0 \alpha^0 + x_1 \alpha^1 + x_2 \alpha^2 + \ldots + x_{n-1} \alpha^{n-1},$$

where $x_0, x_1, \ldots, x_{n-1}$ are values of bits of increasing weight of number x.

By raising number x to the power t, t being a power of 2, the second member is raised to the power t, which provides the sum of terms $x_i \alpha^{it}$ (i=0, 1, ..., n−1) and of additional terms which are repeated an even number of times. Since the sum in the finite field is a bit-to-bit Exclusive-OR, all these additional terms cancel mutually. Hence:

$$x^t = x_0 \alpha^0 + x_1 \alpha^t + x_2 \alpha^{2t} + \ldots + x_{n-1} \alpha^{(n-1)t}.$$

Figure 2:
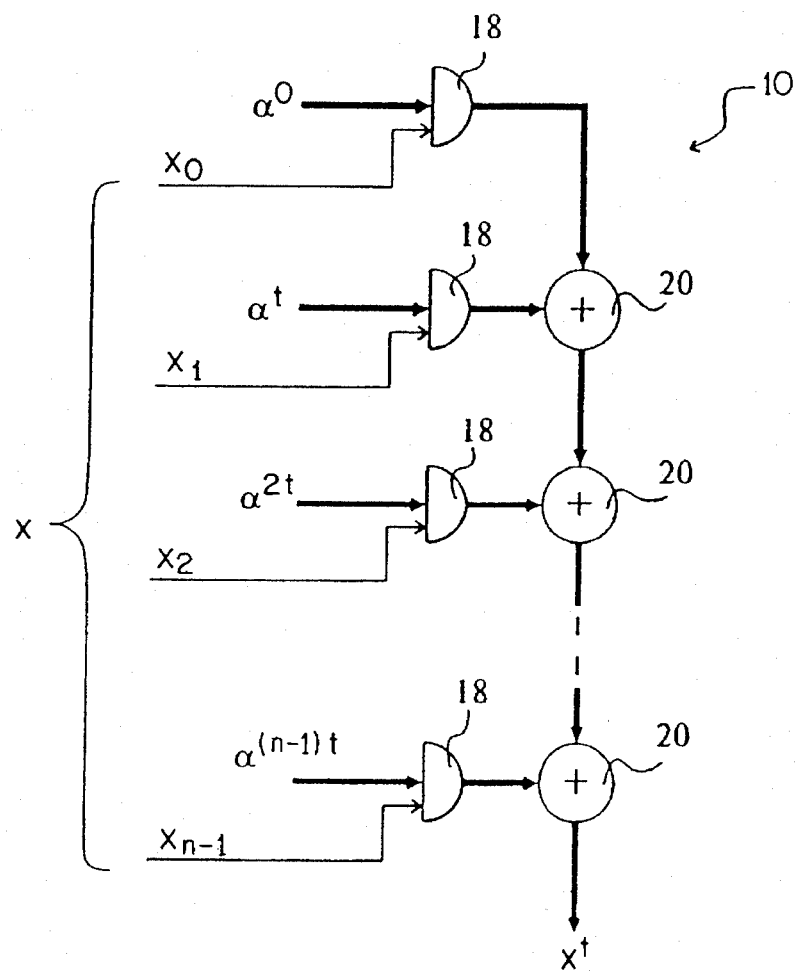
FIG. 2 represents an embodiment of a circuit for raising to a power of a power of two used in the inversion circuit of FIG. 1.

FIG. 2 represents a circuit for raising to the power t which is directly established from this equation. With each bit $x_i$ (i=0, 1, ..., n−1) is associated a group of AND gates 18 which receive the bit $x_i$ on first inputs and the respective bits of number $\alpha^{it}$ on second inputs. Thus, each number $\alpha^{it}$ is transmitted to the output of the corresponding group 18 if $x_i = 1$. A first adder 20 receives on a first input the output of the group 18 associated with bit $x_0$, and on a second input the output of the group 18 associated with bit $x_1$. Additional adders 20 are respectively associated with the remaining groups, each adder 20 receiving on a first input the output of the associated group 18, and on a second input the output of the preceding adder 20. The last adder 20 provides number $x^t$.

Of course, in each group of AND gates 18 associated with a bit $x_i$, AND gates are effectively provided for only the non-zero bits of number $\alpha^{it}$. Similarly, adders 20 (groups of Exclusive-OR gates) can also be simplified by taking into account that some of their input lines are at a constant state.

Figure 3:
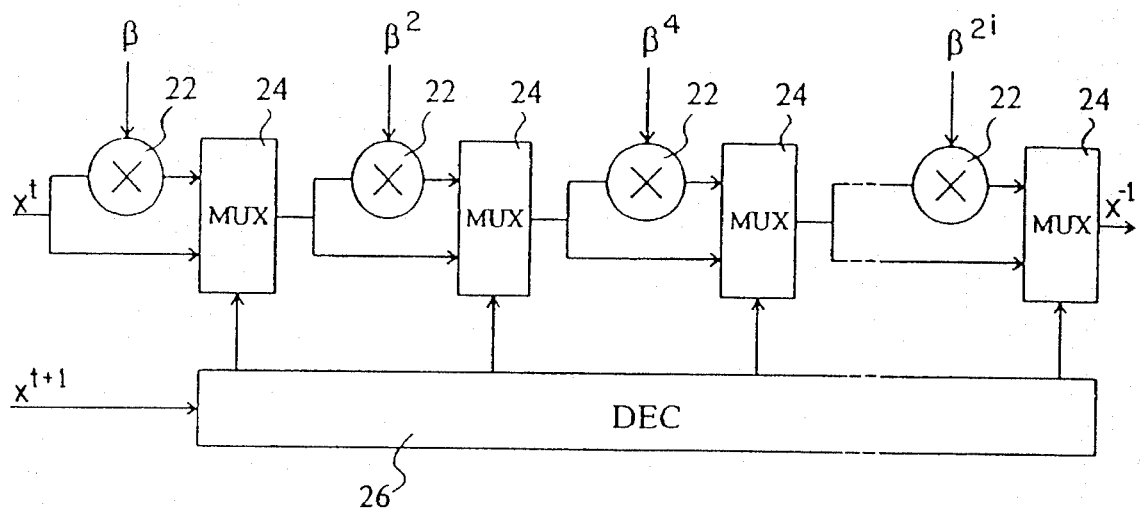
FIG. 3 represents a second embodiment of some of the elements of the circuit of FIG. 1.

FIG. 3 represents an embodiment of a circuit designed to advantageously replace the inversion circuit 14 and multiplier 16 of FIG. 1. This circuit includes n/2 multipliers 22 for multiplying by a constant. The multiplication constants are respectively the numbers $\beta$ to $(\beta^2)^i$, where i varies from 0 to n/2−1.

Each multiplier 22 is associated with a multiplexer 24 which receives in a first channel the output of the multiplier and in a second channel the output of the preceding multiplexer, the latter output being also provided to the input of the multiplier. With this arrangement, by suitably controlling multiplexers 24, a multiplication by any value $\beta^j$ is obtained, where j varies from 1 to t−1. The first multiplier 22 and first multiplexer 24 receive number $x^t$ provided by circuit 10. The last multiplexer 24 provides the desired inverse $x^{-1}$. A decoder 26, which receives the number $x^{t+1}$ provided by the multiplier 12, controls the multiplexers 24 to set in series the multipliers 22 associated with the constants whose product is equal to the inverse of $x^{t+1}$.

The circuit of FIG. 3 is particularly simple because it uses multipliers for multiplying by a constant; providing n/2 multipliers by a constant with associated multiplexers remains simpler than providing a complete multiplier 16. Moreover, the decoder 26 has n/2 outputs only rather than n outputs of the inversion circuit 14 of FIG. 1. Decoder 26 is controlled by only those bits of number $x^{t+1}$ which differentiate the t−1 possible values of number $x^{t+1}$.

In some applications, the structure of FIG. 3 might not be fast enough because number $x^t$ may have to go through a large number of multipliers 22, each of which introduces a delay.

Figure 4:
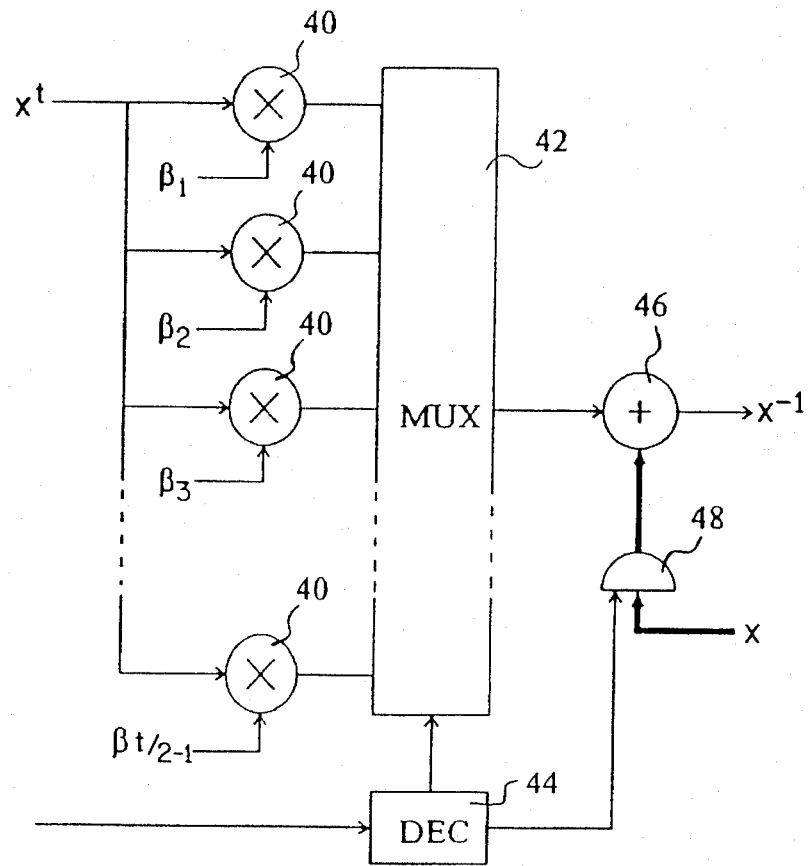
FIG. 4 represents a third embodiment of some of the elements of the circuit of FIG. 1.

FIG. 4 represents a particularly fast alternative of the structure of FIG. 3. Number $x^t$ is provided in parallel to t/2−1 multipliers 40 by a constant. The respective constants are $\beta_1$ to $\alpha_{t/2-1}$. Constants $\beta_1$ to $\beta_{t/2-1}$ are t/2−1 (t−1)th of the unit roots distinct one from the other and from the unit, and such that the t/2−1 remaining roots are $1+\beta_1$ to $1+\beta_{t/2-1}$. In a finite field, if a number r is a p-th root of the unit, number r+1 is also a root of the unit (p being an arbitrary integer lower than N+1).

A multiplexer 42 receives the outputs of multipliers 40 and selects one of them depending upon a control signal provided by a decoder 44. The output of a multiplexer 42 is provided to a first input of an adder 46 which receives at a second input the output of a group of AND gates 48. A first input of gates 48 receives an output of decoder 44, which is set to a state depending upon the parity of the inverse of number $x^{t+1}$.

The second inputs of gates 48 respectively receive the bits of number x. Thus, number x is summed or not summed to the output of multiplexer 42 depending upon the values of number $x^{t+1}$. With this configuration, $x^t$ is multiplied by $\beta_i$ or $1+\beta_i$ (i=1, 2, . . . , t/2−1), i.e., by either one of two (t−1)th roots distinct from the unit. Decoder 44, as a function of the n−1 most significant bits of number $x^{t+1}$ selects the suitable multiplier 40 so that number $\beta_i$ or $1+\beta_i$ by which number $x^t$ is finally multiplied is the inverse of number $x^{t+1}$. In addition, the decoder receives only those bits of number $x^{t+1}$ which differentiate the t/2−1 roots $\beta_1$ to $\beta_{t/2-1}$.

Of course, among the (t−1)th roots of the unit, the unit is present. If number $x^{t+1}$ is equal to 1, number x is also equal to 1; then, for example, the multiplexer 42 is selected to provide number 0 to the adder 46 which then provides the value 1(x) through the group of gates 48.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended to be limiting. The invention is limited only as defined in the following claims and the equivalents thereto.

What is claimed is:

1. A circuit for inverting a number of n bits, the number being of a finite field of $2^n$=N+1 elements, comprising:

a raising circuit that receives the number, and raises the number to a power $t=2^{n/2}$;

a first complete multiplier that receives both the number and an output of the raising circuit that raises the number to the power t; and a calculating circuit that provides a product of the output of the raising circuit that raises the number to the power t and an inverse of an output of the first complete multiplier, including:

t/2−1 multipliers that multiply the output of the raising circuit by constants, the constants being (t−1)th roots of a unit, and being distinct from each other and the unit, each multiplier receiving the output of the raising circuit that raises the number to the power t;

a multiplexer controlled by a decoder that selects an output of one of the t/2−1 multipliers as a function of the output of the first complete multiplier; and an adder that receives both an output of the multiplexer and, depending upon the output of the first complete multiplier, one of a value 0 and the number.

2. The circuit of claim 1, wherein the raising circuit that raises the number to the power t includes:

n groups of gates, an i-th group of the n groups of gates providing an i-th non-zero element of the finite field when a state of an i-th bit of the number is 1, and providing a value 0 when the state of the i-th bit of the number is 0; and n−1 adders, a j-th adder of the n−1 adders receiving an output of a j-th group of the n groups of gates and an output of a (j−1)th adder of the n−1 adders, a first adder of the n−1 adders receiving outputs of a first group and a second group of the n groups of gates.

3. A circuit for inverting a number of n bits, the number being of a finite field of $2^n$=N+1 elements, comprising:

a raising circuit that receives the number, and raises the number to a power $t=2^{n/2}$;

a first complete multiplier that receives both the number and an output of the raising circuit that raises the number to the power t; and a calculating circuit that provides a product of the output of the raising circuit that raises the number to the power t and an inverse of an output of the first complete multiplier, including n/2 multipliers, each multiplier having an input and multiplying the input by a constant, an i-th multiplier of the n/2 multipliers multiplying its input by a constant $\beta^{2i}$, where $\beta$ is a (t−1)th root of a unit;

n/2 multiplexers, an i-th multiplexer of the n/2 multiplexers receiving an output of the i-th multiplier at a first input and an output of an (i−1)th multiplexer at a second input, and providing an output to an (i+1)th multiplier, an input of a first multiplier of the n/2 multipliers and an input of a first multiplexer receiving the output of the raising circuit that raises the number to the power t; and a decoder that receives the output of the first complete multiplier and acts on the n/2 multiplexers to set in series multipliers, of the n/2 multipliers, that multiply their inputs by constants whose product is the inverse of the output of the first complete multiplier.

4. An apparatus for inverting a first number, the apparatus comprising:

a raising circuit having an input that receives the first number, and an output that provides a second number, the second number being equal to the first number raised to a power t;

a first multiplying circuit having a first input that receives the first number, a second input coupled to the output of the raising circuit, and an output that provides a third number equal to the first number times the second number; and a calculating circuit having a first input coupled to the output of the raising circuit, a second input coupled to the output of the first multiplying circuit, and an output that provides an inverse of the first numbers, wherein the calculating circuit includes:

a decoding circuit having an input coupled to the output of the first multiplying circuit, a first output, and a second output;

a multiplexer having a first input coupled to the first output of the decoding circuit, a plurality of second inputs, and an output;

a plurality of multipliers, each multiplier having a first input coupled to the output of the raising circuit, a second input that receives a constant, and an output coupled to a respective one of the plurality of second inputs of the multiplexer; and a gate circuit having a first input coupled to the second output of the decoding circuit, a second input that receives the first number, and an output that provides one of a value 0 and the first number according to a signal of the second output of the decoding circuit; and an adding circuit having a first input coupled to the output of the multiplexer, a second input coupled to the output of the gate circuit, and an output that provides the inverse of the first number.

5. The apparatus of claim 4, wherein the first number has n bits, and wherein the power t equals $2^{n/2}$.

6. The apparatus of claim 5, wherein the first number is an element of a finite field of $2^n$ elements, each element of the finite field having n bits, and wherein the raising circuit includes:

a plurality of gate circuits, each gate circuit having a first input that receives one of the n bits of the first number, a second input that receives one of the elements of the finite field, and an output that provides the one of the elements of the finite field when the one of the n bits is in a first state, and a value 0 when the one of the n bits is in a second state; and a cascading series of adding circuits, the cascading series of adding circuits including a plurality of inputs, each input coupled to the output of one of the plurality of gate circuits, and an output that provides the second number.

7. An apparatus for inverting a first number, the apparatus comprising:

a raising circuit having an input that receives the first number, and an output that provides a second number, the second number being equal to the first number raised to a power t;

a first multiplying circuit having a first input that receives the first number, a second input coupled to the output of the raising circuit, and an output that provides a third number equal to the first number times the second number; and a calculating circuit having a first input coupled to the output of the raising circuit, a second input coupled to the output of the first multiplying circuit, and an output that provides an inverse of the first number, wherein the calculating circuit includes:

a decoder having an input coupled to the output of the first multiplier, and a plurality of outputs; and a cascading series of processing circuits, each of the processing circuits including a first input that receives a constant, a second input coupled one of to the output of the decoder, an output, and a third input coupled to an output of a previous processing circuit, wherein the first processing circuit in the series has its input coupled to the output of the raising circuit, and the last processing circuit in the series has an output that provides the inverse of the first number.

8. The apparatus of claim 7, wherein each processing circuit of the cascading series of processing circuits includes:

a multiplexer having an output, a first input, a second input coupled to one of the output of the raising circuit and the output of the multiplexer of a previous processing circuit of the cascading series of processing circuits, and a third input coupled to one of the plurality of outputs of the decoder; and a processing circuit multiplier having a first input coupled to a respective one of the plurality of first inputs of the cascading series of processing circuits, a second input coupled to one of the output of the raising circuit and the output of the multiplexer of the previous processing circuit of the cascading series of processing circuits, and an output coupled to the first input of the multiplexer.

9. An apparatus for inverting a first number, the apparatus comprising:

a raising circuit having an input that receives the first number, and an output that provides a second number, the second number being equal to the first number raised to a power t;

a first multiplying circuit having a first input that receives the first number, a second input coupled to the output of the raising circuit, and an output that provides a third number equal to the first number times the second number; and means, coupled to both the output of the raising circuit and the output of the first multiplying circuit, for calculating an inverse of the first number as a function of the second number and the third number, wherein the means for calculating includes:

a decoding circuit having an input coupled to the output of the first multiplying circuit, a first output, and a second output;

a multiplexer having a first input coupled to the first output of the decoding circuit, a plurality of second inputs, and an output;

a plurality of multipliers, each multiplier having a first input coupled to the output of the raising circuit, a second input that receives a constant, and an output coupled to one of the plurality of second inputs of the multiplexer; and a gate circuit having a first input coupled to the second output of the decoding circuit, a second input that receives the first number, and an output that provides one of the first number and a value 0 according to a signal of the second output of the decoder; and an adding circuit having a first input coupled to the output of the multiplexer, a second input coupled to the output of the gate circuit, and an output that provides the inverse of the first number.

10. The apparatus of claim 9, wherein the first number has n bits, and wherein the power t equals $2^{n/2}$.

11. The apparatus of claim 10, wherein the first number is an element of a finite field of $2^n$ elements, each element of the finite field having n bits, and wherein the raising circuit includes:

a plurality of gate circuits, each gate circuit having a first input that receives one of the n bits of the first number, a second input that receives one of the elements of the finite field, and an output that provides the one of the elements of the finite field when the one of the n bits is in a first state, and a value 0 when the one of the n bits is in a second state; and a cascading series of adding circuits, the cascading series of adding circuits including a plurality of inputs, each input coupled to the output of one of the plurality of gate circuits, and an output that provides the second number.

12. An apparatus for inverting a first number, the apparatus comprising:

a raising circuit having an input that receives the first number, and an output that provides a second number, the second number being equal to the first number raised to a power t;

a first multiplying circuit having a first input that receives the first number, a second input coupled to the output of the raising circuit, and an output that provides a third number equal to the first number times the second number; and means, coupled to both the output of the raising circuit and the output of the first multiplying circuit, for calculating an inverse of the first number as a function of the second number and the third number, wherein the means for calculating includes:

a decoder having an input coupled to the output of the first multiplier, and a plurality of outputs; and a cascading series of processing circuits, each of the processing circuits including a first input that receives a constant, a second input coupled one of to the output of the decoder, an output, and a third input coupled to an output of a previous processing circuit, wherein the first processing circuit in the series has its input coupled to the output of the raising circuit, and the last processing circuit in the series has an output that provides the inverse of the first number.

13. The apparatus of claim 12, wherein each processing circuit includes:
- a multiplexer having an output, a first input, a second input coupled to one of the output of the raising circuit and the output of the multiplexer of a previous processing circuit of the cascading series of processing circuits, and a third input coupled to one of the plurality of outputs of the decoder; and
- a processing circuit multiplier having a first input that receives one of the plurality of constants, a second input coupled to one of the output of the raising circuit and the output of the multiplexer of the previous processing circuit of the cascading series of processing circuits, and an output coupled to the first input of the multiplexer.

14. A method for inverting a first number, the method comprising the steps of:
- A. generating a second signal according to a first signal, the first signal being indicative of the first number, and the second signal being indicative of the first number raised to a power t;
- B. multiplying the first signal by the second signal to provide a third signal, the third signal being indicative of the first number times the second number; and
- C. generating an inverse signal as a function of both the second signal and the third signal, the inverse signal being indicative of an inverse of the first number, wherein step C includes the steps of:
  decoding the third signal to provide a control signal and a state signal;
  multiplying the second signal by a plurality of constants to produce a plurality of product signals;
  multiplexing the plurality of product signals according to the control signal to provide a multiplexed signal; and
  adding the first signal to the multiplexed signal when the state signal is in a predetermined state.

15. The method of claim 14, wherein first signal is a digital signal having n bits, and wherein the power t equals $2^{n/2}$.

16. The method of claim 15, wherein the first number is an element of a finite field of $2^n$ elements, each element of the finite field being representable as a signal having n bits, and wherein step A includes the steps of:
- providing a plurality of element signals, each element signal being provided for one of the n bits of the first signal, and each element signal being indicative of one of the $2^n$ elements of the finite field when the one of the n bits is in a first state, and a value 0 when the one of the n bits is in a second state; and
- adding the plurality of element signals to provide the second signal.

17. A method for inverting a first number, the method comprising the steps of:
- A. generating a second signal according to a first signal, the first signal being indicative of the first number, and the second signal being indicative of the first number raised to a power t;
- B. multiplying the first signal by the second signal to provide a third signal, the third signal being indicative of the first number times the second number; and
- C. generating an inverse signal as a function of both the second signal and the third signal, the inverse signal being indicative of an inverse of the first number, wherein step C includes the steps of:
  decoding the third signal to provide a plurality of control signals; and
  passing the second signal through a series of processing circuits that generates the inverse signal according to the plurality of control signals.

18. The method of claim 17, wherein each of the series of processing circuits performs the steps of:
- multiplying one of the second signal and an intermediate signal by a constant to produce a product signal; and
- multiplexing the product signal and one of the second signal and the intermediate signal according to one of the plurality of control signals.

* * * * *

UNITED STATES PATENT AND TRADEMARK OFFICE
CERTIFICATE OF CORRECTION

PATENT NO. : 5,612,910
DATED : March 18, 1997
INVENTOR(S) : Jacques MEYER

It is certified that error appears in the above-identified patent and that said Letters Patent is hereby corrected as shown below:

The title page showing the illustrative figure should be deleted and substitute therefor the attached title page.

In the drawings Figures 1, 3 and 4, should be deleted to be replaced with the corrected drawing Figures 1, 3, and 4, as shown on the attached pages.

United States Patent [19]
Meyer

[11] Patent Number: 5,612,910
[45] Date of Patent: Mar. 18, 1997

[54] CIRCUIT FOR INVERTING ELEMENTS OF A FINITE FIELD

[75] Inventor: Jacques Meyer, La Tronche, France

[73] Assignee: SGS-Thomson Microelectronics S.A., Saint Genis Pouilly, France

[21] Appl. No.: 501,964

[22] Filed: Jul. 13, 1995

[30] Foreign Application Priority Data

Aug. 5, 1994 [FR] France ................... 94 09927

[51] Int. Cl.$^6$ .............................. G06F 7/00; G06F 15/00
[52] U.S. Cl. ............................................... 364/746.1
[58] Field of Search ............................ 364/746.1, 716, 364/724.16, 724.19, 748, 754, 757, 753, 758, 759, 752, 760, 786, 787; 341/87; 327/199, 408; 326/38; 371/375

[56] References Cited

U.S. PATENT DOCUMENTS

| | | | |
|---|---|---|---|
| 4,866,654 | 9/1989 | Yamada | 364/754 |
| 4,975,867 | 12/1990 | Weng | 364/746.1 |
| 4,989,171 | 1/1991 | Hollmann | 364/746.1 |
| 4,994,995 | 2/1991 | Anderson et al. | 364/746.1 |
| 5,068,856 | 11/1991 | Nagasawa et al. | 371/37.5 |
| 5,465,069 | 11/1995 | Boiron et al. | 327/333 |
| 5,467,297 | 11/1995 | Zook | 364/746.1 |

*Primary Examiner*—Roy N. Envall, Jr.
*Assistant Examiner*—Monica Lewis
*Attorney, Agent, or Firm*—David M. Driscoll; James H. Morris; Brett N. Dorny

[57] ABSTRACT

A circuit for inverting a number of n bits of a finite field of $2^n=N+1$ elements comprises a first circuit for raising to the power $t=2^{n/2}$ receiving the number to invert. A first complete multiplier receives the number to invert and the output of the circuit for raising to the power t. A second circuit provides the product of the output of the circuit for raising to the power t and the inverse of the output of the first complete multiplier.

18 Claims, 2 Drawing Sheets

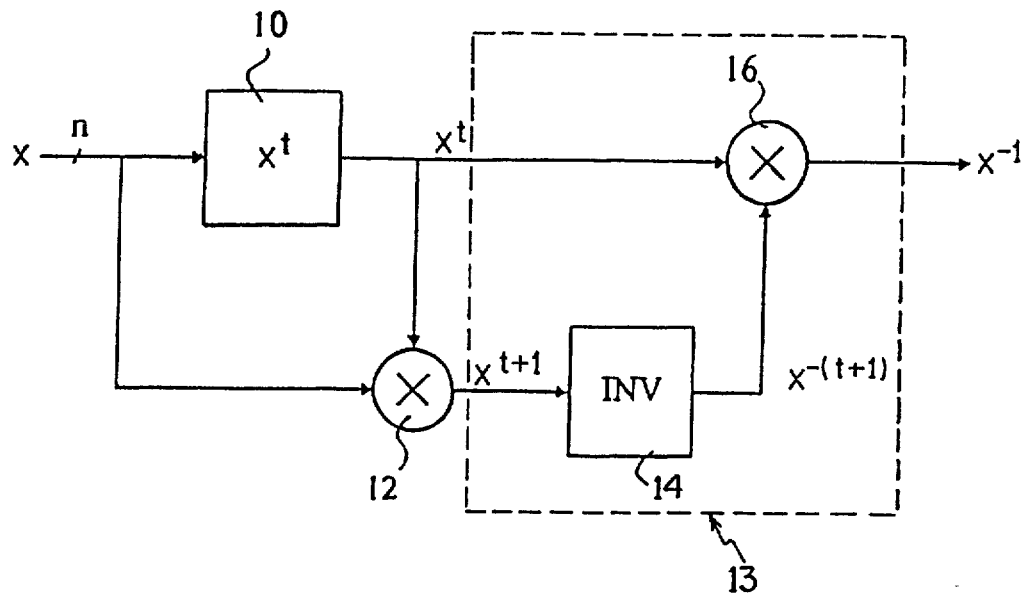

UNITED STATES PATENT AND TRADEMARK OFFICE
CERTIFICATE OF CORRECTION

PATENT NO. : 5,612,910

DATED : March 18, 1997

INVENTOR(S): Jacques MEYER

It is certified that error appears in the above-identified patent and that said Letters Patent is hereby corrected as shown below:

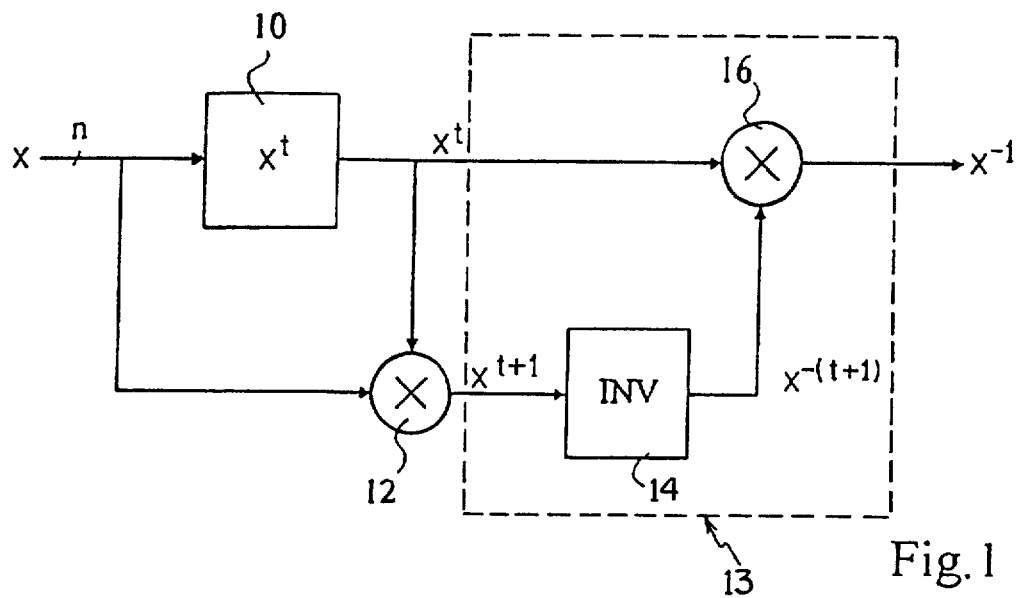

Fig. 1

UNITED STATES PATENT AND TRADEMARK OFFICE
CERTIFICATE OF CORRECTION

PATENT NO. : 5,612,910
DATED : March 18, 1997
INVENTOR(S): Jacques MEYER

It is certified that error appears in the above-identified patent and that said Letters Patent is hereby corrected as shown below:

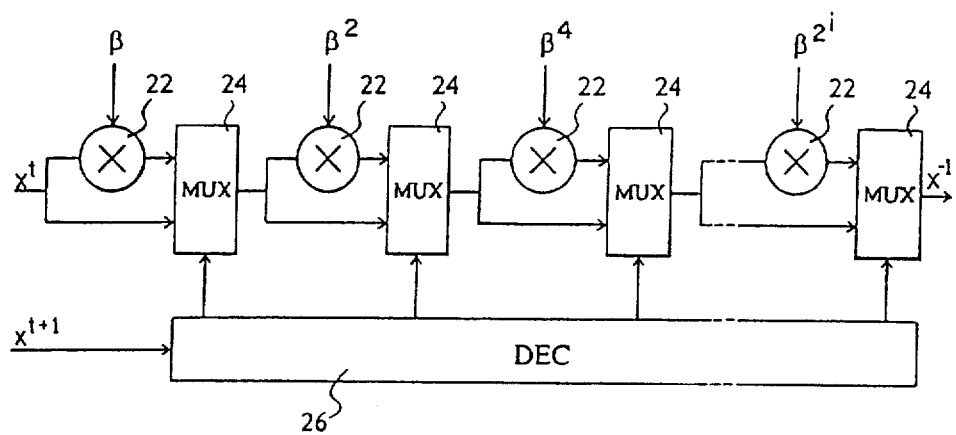

Fig.3

UNITED STATES PATENT AND TRADEMARK OFFICE
CERTIFICATE OF CORRECTION

PATENT NO. : 5,612,910

DATED : March 18, 1997

INVENTOR(S): Jacques MEYER

It is certified that error appears in the above-identified patent and that said Letters Patent is hereby corrected as shown below:

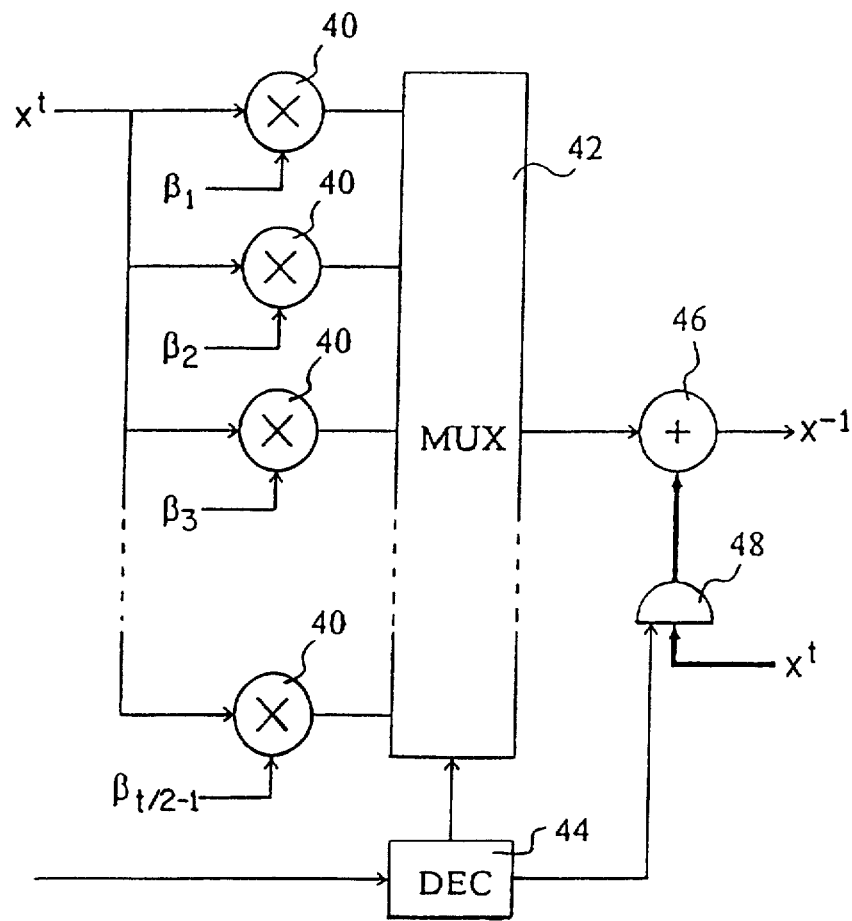

Fig.4

UNITED STATES PATENT AND TRADEMARK OFFICE
CERTIFICATE OF CORRECTION

PATENT NO.    :   5,612,910

DATED         :   March 18, 1997

INVENTOR(S):      Jacques MEYER

It is certified that error appears in the above-identified patent and that said Letters Patent is hereby corrected as shown below:

In column 2, line 25, replace "$\beta^{2i}$" with --- $\beta^{2^t}$ ---.
In column 6, line 11, replace "$\beta^{2i}$" with --- $\beta^{2^t}$ ---.
In column 4, line 27, replace "$(\beta^2)^i$" with --- $\beta^{2^t}$ ---.
In column 4, line 57, replace "$\alpha_{t/2-1}$" with --- $\beta_{t/2-1}$ ---.
In column 5, line 5, replace "x" with ---$x^t$ ---.
In column 5, line 16, replace "x" with ---$x^t$ ---.
In column 5, line 19, replace "1(x)" with ---$1(=x^t)$---.
In column 5, line 51, replace "number" with ---number x raised to the power t---.
In column 6, line 54, replace "number" with ---number x raised to the power t---.
In column 6, line 55, replace "number" with ---number x raised to the power t---.
In column 8, line 19, replace "number" with ---number x raised to the power t---.
In column 8, line 20, replace "number" with ---number x raised to the power t---.

Signed and Sealed this

Ninth Day of May, 2000

Q. TODD DICKINSON

*Attest:*

*Attesting Officer*          *Director of Patents and Trademarks*